United States Patent [19]

Brugger, deceased et al.

[11] Patent Number: 4,476,851
[45] Date of Patent: Oct. 16, 1984

[54] WINDMILL ENERGY SYSTEM

[76] Inventors: Hans Brugger, deceased, late of Nyack, N.Y.; Wilhelmina B. Brugger, Administratrix, Grand View 9-W, Nyack, N.Y. 10960

[21] Appl. No.: 337,526

[22] Filed: Jan. 7, 1982

[51] Int. Cl.$^3$ ............................................... F24C 9/00
[52] U.S. Cl. ..................................... 126/247; 237/11; 122/26; 417/255; 417/519; 417/334
[58] Field of Search ................... 237/11, 2 B; 126/247; 62/404, 405, 401, 260, 172; 417/255, 519, 334; 122/26

[56] References Cited

U.S. PATENT DOCUMENTS

| | | | |
|---|---|---|---|
| 940,567 | 11/1909 | Wales | 237/11 |
| 1,508,806 | 9/1924 | Silvestri | 417/334 |
| 2,539,862 | 1/1951 | Rushing | 62/260 |

Primary Examiner—Albert J. Makay
Assistant Examiner—Henry Bennett

[57] ABSTRACT

A windmill energy system for extracting energy from available wind power comprising a windmill in combination with a compressor pump in an essentially closed loop system with the compressor pump including a tubular upper section having a cylindrical bore forming a piston chamber in which a piston is reciprocated and a lower section having a control chamber, a crankshaft assembly located in the control chamber for reciprocating the piston, a first and second passageway in the lower section, conduit means for interconnecting the first and second passageways with the piston chamber and a heat exchange medium and means rotatably mounted to the crankshaft assembly for opening the first passageway while closing the second and vice versa during consecutive discharge and suction strokes.

1 Claim, 4 Drawing Figures

WINDMILL ENERGY SYSTEM

This invention relates to a windmill system for extracting energy from available wind power and converting such energy into useful heat.

Conventional windmills operate relatively inefficiently except at high wind speed requiring the availability of strong winds. This makes the windmill useful only in certain limited geographical areas. Moreover, to capture strong winds a high altitude is necessary with windmill operation intended at high rotating blade speeds. High blade speeds require a very strong structure which limits the utility of the conventional windmill system to commercial applications. To improve the windmill system some attention has been given to the design of the windmill blades. A more complex blade arrangement and construction only adds to the complexity of a windmill system and renders it more difficult to maintain. Because of the energy attractiveness of the windmill operation an improved windmill system has been long sought which would operate efficiently at low wind speeds. It would also be desirable for the windmill to be capable of attachment to the roof of a family dwelling at a relatively short distance therefrom so that it does not appear unsightly thereby making it more attractive for home ownership particularly in conjunction with and as a supplement to a solar energy conversion system.

The windmill system of the present invention operates efficiently at low wind speeds of only 6-10 mph. At such low speeds the windmill will not experience the large forces normally associated with high speed operation. Accordingly, the structural requirements for the windmill are substantially lower. In addition, the geographical location for the windmill is not as critical nor does it require as much altitude. Thus the windmill can be designed somewhat more compact and with greater consideration toward esthetics.

The high efficiency at low wind speed is realized in accordance with the present invention by using the windmill to drive a compressor pump on a single stroke cycle in a substantially closed loop system with the compressor fluid in the closed loop system return path used to supplement the available wind force for providing a driving force behind the piston at the start of the discharge cycle. The windmill system comprises a windmill in combination with a compressor pump having a reciprocating piston driven by the windmill shaft through a crankshaft assembly disposed in a control chamber located within the compressor pump body adjacent the pumping chamber. A fluid is compressed in the pumping chamber of the compressor and circulated through a heat exchanger from where it is recirculated through the control chamber and back into the pumping chamber in a closed loop. The windmill, crankshaft assembly and piston represent the only moving parts in the system.

Accordingly, it is the principal object of the present invention to provide a windmill system which operates at high efficiency in the presence of low wind speeds.

It is a further object of the present invention to provide a windmill system for low speed operation which is of a simple construction requiring minimal maintenance and has few moving parts.

Other objects and advantages of the present invention will become apparent from the following detailed description of the preferred embodiment of the invention when read in conjunction with the accompanying drawings of which:

Figure 1:
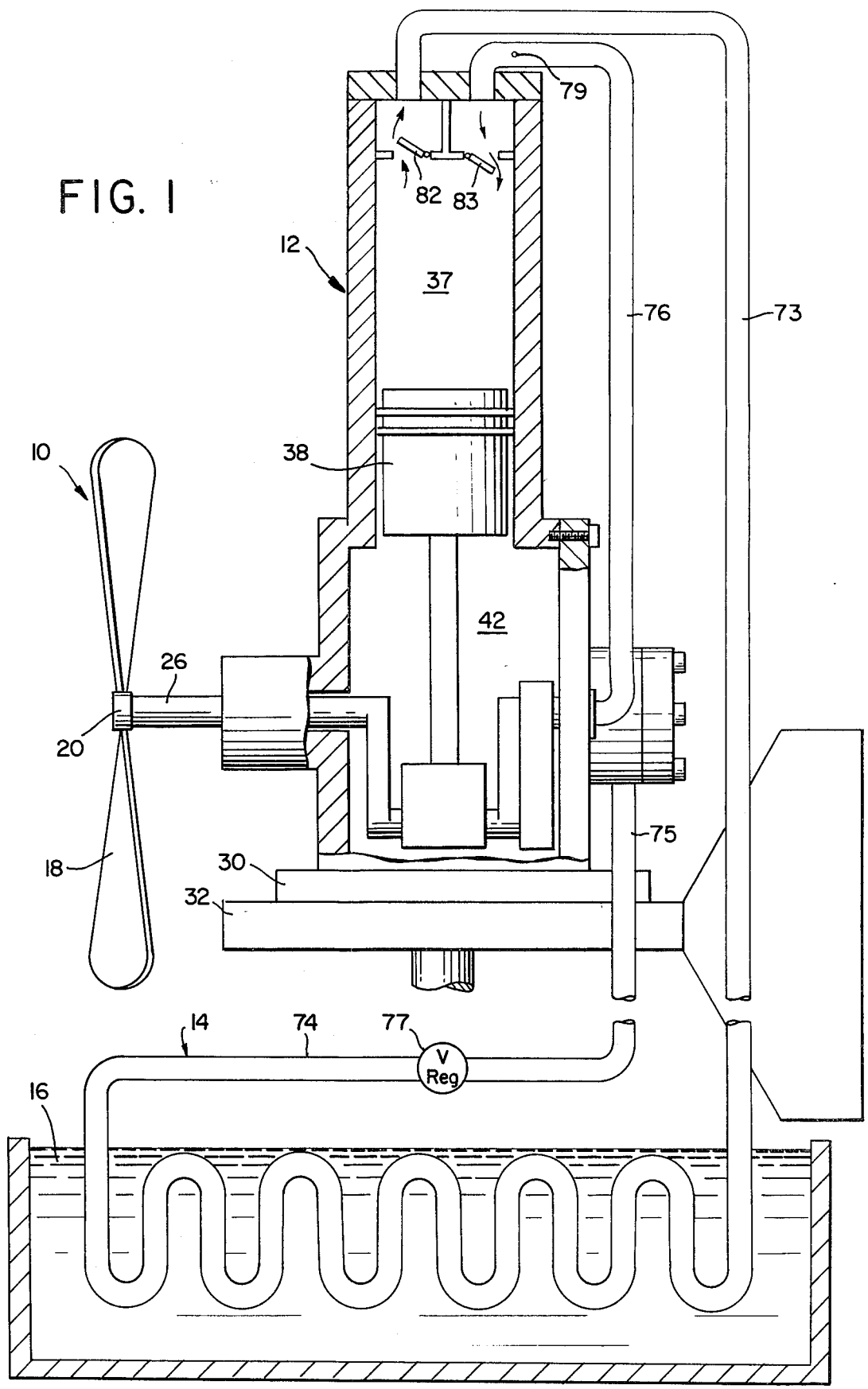
FIG. 1 is a plan view of the preferred windmill system of the present invention for converting wind power into useful heat shown partially diagrammatic and partially in section.
Figure 2:
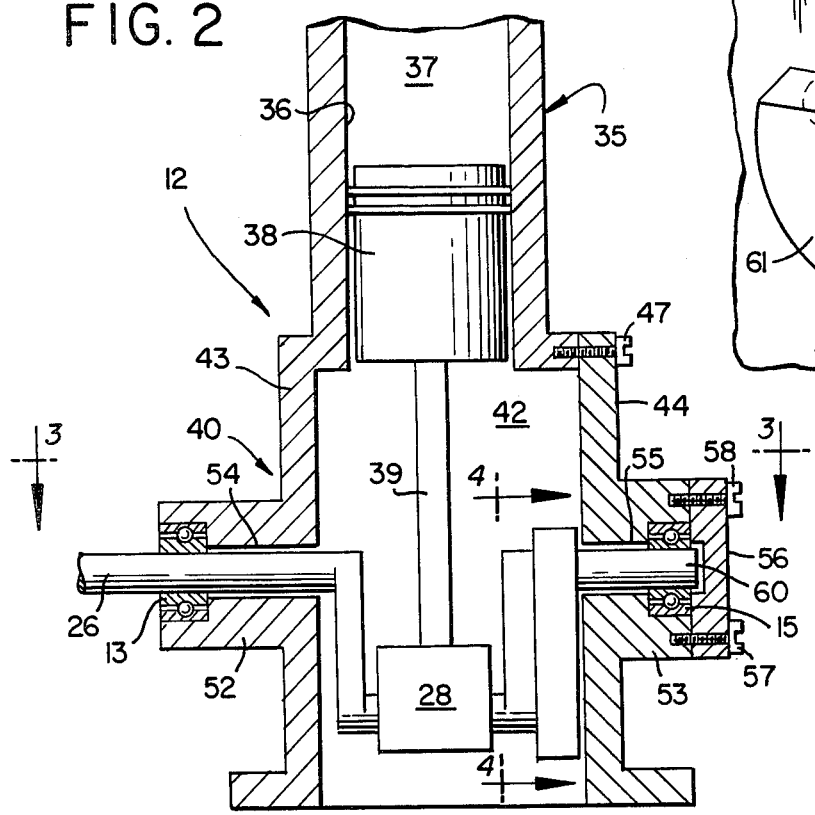
FIG. 2 is a more detailed view of compressor pump of FIG. 1.
Figure 4:
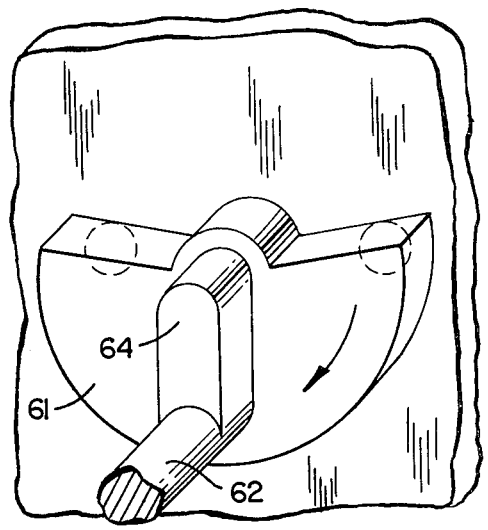
FIG. 4 is an enlarged view in perspective of a portion of the compressor pump of FIG. 2 taken along the lines 4—4 of FIG. 2.

Referring now to the drawings wherein like components are designated by like reference numerals throughout the various figures, the windmill system as shown in FIG. 1 comprises a windmill 10 in combination with a compressor pump 12 arranged to form a closed loop system 14 through a heat exchange medium such as, for example, a water tank 16. The windmill 10 may be of any conventional design having one or more blades 18 radially extending from a rotor 20 attached to one end of a rotatable shaft 26. The drive shaft 26 is connected to a conventional crankshaft assembly 28 mounted in support bearing assemblies 13 and 15 in the compressor pump 12 to provide free rotation about a horizontal axis coaxial with the longitudinal axis of the shaft 26. The compressor pump 12 is fixedly mounted upon a frame 30 which is in turn affixed to a platform 32. The platform 32 is supported by a support column 34 which is free to rotate about a support bearing assembly (not shown) so as to permit the platform 32, windmill 10 and compressor pump 12 to rotate about a substantially vertical axis. The support column 34 is also supported by a vertical tower (not shown) which may be connected to any desired foundation such as the roof of a dwelling. A wind vane 36 extends from the platform 32 and operates to revolve the platform 32 in a substantially horizontal plane about a vertical axis in response to changes in the direction of the wind. The windmill 10 may turn in either direction in response to movement at the wind vane. The position of the wind vane is displaced from the position of the frame 30 upon which the windmill 10 is mounted to provide a moment arm relative to the rotatable axis of the platform 32 for controlling the rotation of the windmill as is well known in the art.

Figure 3:
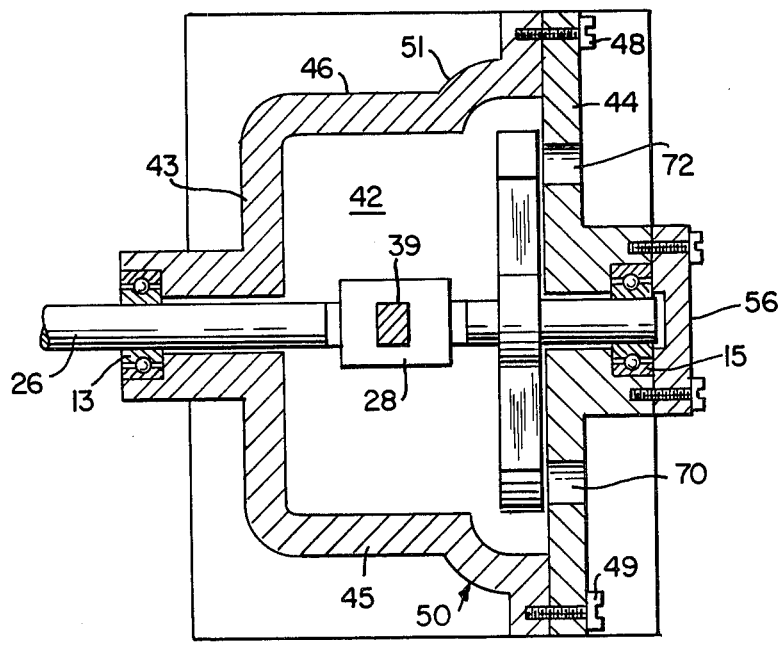
FIG. 3 is a top plan view of the control chamber in the compressor pump body taken along the lines 3—3 of FIG. 2.

The compressor pump 12 has a tubular upper body section 35 with a cylindrical bore 36 forming a pumping chamber 37 in which a piston 38 is disposed in sealing and sliding engagement with the bore 36. The piston 38 is connected to a piston rod 39 which serves as the connecting rod to the crankshaft assembly 28. The compressor pump 12 also has a lower body section 40 extending from the upper body section 35 to form a control chamber 42 which is separated from the pumping chamber 37 by the piston 38. The lower body section 35 has a pair of side walls 43 and 44 and a front and back wall 45 and 46 respectively. The side wall 43 and the front and back walls 45 and 46 are integrally cast as one body with the upper body section 35. The side wall 44 is attached to the front and back walls 45 and 46 by means of bolts 47, 48 and 49. The side wall 44 as shown in FIG. 3 is longer in dimension than the side wall 43. The front and back walls 45 and 46 extend horizontally from the side wall 43 and then curve outwardly to form the curved sections 50 and 51 which connect to the longer side wall 44. The height of the tubular upper section 35 of the pump 12 is greater than the corresponding height of the lower section 40 so that the volume of the pumping chamber 37 is substantially equal to the volume of the control chamber 42.

Each side wall 43 and 44 has a corresponding tubular extension 52 and 53 with coaxially aligned bores 54 and 55 respectively. The support bearing assemblies 13 and 15 are fitted into recesses formed at the end of the tubular extensions 52 and 53 respectively. The tubular extension 53 is closed off by a cover plate 56 connected thereto by bolts 57 and 58.

The crankshaft assembly 28 is located in the control chamber 42 in the lower section 40 of the compressor pump 12. The crankshaft assembly 28 is connected to the drive shaft 28 which is journaled in the bearing assembly 13 and is also connected to an outer shaft 60 journaled in the bearing assembly 15. The outer shaft 60 is connected to the crankshaft 62, extending from the crankshaft assembly 28, through an intermediate link 64 and a plate or disk 66 which has an axis of rotation coincident with the horizontal axis of rotation of the drive shaft 26. The outer shaft 60, disk 66, link 64 and crankshaft 62 are preferably integrally cast in one piece.

The side wall 44 has two openings 70 and 72 which are adapted to be connected to the conduits 75 and 76 of FIG. 1 to form the closed loop system 14 as will be explained in greater detail hereafter. The disk 66 is intended to cover one of the openings 70 and 72 during each consecutive stroke of the reciprocating piston 38 while exposing the other. It is preferable that the openings 70 and 72 be displaced from one another as far as possible. Accordingly, the shape of the disk 66 will depend upon the location of the openings 70 and 72 relative to one another. Assuming they are laterally displaced the disk 66 will assume a circular shape slightly larger than a semi-circle and circumscribing an arc of somewhat greater than 180° and preferably between 180°–190°. The disk 66 rotates in sliding engagement with the side wall 44. To assure a good sealing surface with high degrees of wearability a liner may be attached to the disk 66 facing the wall 44. However, with the low speeds of operation little wear is encountered.

The openings 70 and 72 may also be placed in the front and back walls 45 and 46 in the sections 50 and 51 respectively and preferably adjacent the side wall 44. In this case they would be vertically displaced from one another with the diameter of the disk 66 extending into sliding engagement with the sections 50 and 51 to close off one opening while exposing the other during one stroke and vice versa during the opposite stroke.

The compressor pump 12 operates in a conventional fashion to compress a working fluid such as air during the discharge stroke forcing the compressed air through the exhaust valve 82. During the suction stroke the exhaust valve 82 closes and intake valve 83 opens to draw air into the pumping chamber 37. Intake valve 83 and exhaust valve 82 may be flap or reed valves actuated by pressure difference or poppet valves positively operated by cams (not shown) in a conventional manner. The intake and exhaust valves 82 and 83 are positioned in the upper body section 35 at the upper end of pumping chamber 37.

A wind of as little as six or seven miles per hour will rotate the crankshaft to compress air in the pumping chamber 37. This compressed hot air is passed through the exhaust valve 82 into the deliver conduit 73 which is preferably insulated tubing through the supporting structure of a building into a heat exchanger such as the water tank 16. The hot air loses a lot of its heat in the water tank 16 and leaves the water tank 16 while still under pressure at a temperature slightly higher than the temperature of the water tank 16. This cooler and still compressed air returns through the return conduit 74 and through an adjustable pressure regulating valve 77 into the conduit 75. The adjustable reducing valve 77 will not permit the return air to flow unless it is higher than a certain manually set pressure. Upon exceeding such preset condition the air is fed through opening 70 into the control chamber 42 of the pump 12 at the start of the discharge cycle in order to help push up the piston 38 on every upward discharge stroke. Upon approaching the top of the discharge stroke opening 70 begins to close off and approximately at the top of the stroke is totally closed off while the opening 72 begins to open to the chamber 42 where the air is fed back through the inlet valve 83 into the chamber 37. A pin hole 79 may desirably be located at the entrance of the return conduit 76 to the inlet valve 83 to assure inlet air at ambient pressure and temperature. However, this is not essential since the differential, if any, should not be large.

Should the wind increase in speed and is able to provide more power, then the pressure in the system will increase. The higher heat and pressure caused at higher wind speeds will merely increase the heat available for absorption into the water tank 16 and will not otherwise change the operating sequence discussed above.

What is claimed is:

1. A windmill energy system comprising a windmill, including windmill blades rotatably connected to a drive shaft, in combination with a compressor pump in an essentially closed loop system; said compressor including a tubular upper section having a piston chamber in which a piston is slidably disposed, a lower section forming a control chamber separated from said piston chamber by said piston; a crankshaft assembly disposed in said control chamber for reciprocating said piston in response to rotation of said windmill blades, a first and second passageway each extending through said lower section in communication with said control chamber, conduit means for interconnecting said first and second passageway with said piston chamber through a heat exchange means for forming said closed loop, and means rotatably connected to said crankshaft assembly for opening said first passageway and closing said second passageway during the piston discharged stroke and for opening said second passageway and closing said first passageway during the piston suction stroke and further comprising inlet valve means connected to said piston chamber and exhaust valve means connected to said piston chamber with said conduit means having a first conduit connected to said piston chamber through said inlet valve means and to said first passageway and a second conduit connected to said piston chamber through said exhaust valve means and to said second passageway through said heat exchange means and a pressure regulating valve coupling said second conduit to said second passageway and wherein said means for opening and closing said passageways during consecutive strokes of said piston comprises a disk in abutting relationship against said side wall through which said passageways extend, said disk circumscribing an arc of greater than 180°.

* * * * *